US012169309B2

(12) United States Patent
Tanaka et al.

(10) Patent No.: US 12,169,309 B2
(45) Date of Patent: Dec. 17, 2024

(54) MULTI-FIBER OPTICAL CONNECTOR AND OPTICAL FIBER CONNECTION METHOD

(71) Applicant: NIPPON TELEGRAPH AND TELEPHONE CORPORATION, Tokyo (JP)

(72) Inventors: Yasunari Tanaka, Musashino (JP); Ryo Koyama, Musashino (JP); Masaaki Takaya, Musashino (JP); Yoshiteru Abe, Musashino (JP); Chisato Fukai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 14 days.

(21) Appl. No.: 17/641,052

(22) PCT Filed: Sep. 10, 2020

(86) PCT No.: PCT/JP2020/034239
§ 371 (c)(1),
(2) Date: Mar. 8, 2022

(87) PCT Pub. No.: WO2021/049561
PCT Pub. Date: Mar. 18, 2021

(65) Prior Publication Data
US 2024/0045152 A1    Feb. 8, 2024

(30) Foreign Application Priority Data
Sep. 10, 2019   (WO) .................. PCT/JP2019/035538

(51) Int. Cl.
*G02B 6/38*   (2006.01)
*G02B 6/40*   (2006.01)

(52) U.S. Cl.
CPC ........... *G02B 6/3838* (2013.01); *G02B 6/403* (2013.01)

(58) Field of Classification Search
CPC ......... G02B 6/3838; G02B 6/403; G02B 6/38
See application file for complete search history.

(56) References Cited

U.S. PATENT DOCUMENTS

| 6,328,481 | B1 | 12/2001 | Nakaya | |
| 9,158,064 | B2 * | 10/2015 | Saito | G02B 6/2551 |
| 11,822,134 | B2 * | 11/2023 | Morishima | G02B 6/3885 |
| 2015/0043871 | A1 * | 2/2015 | Mitose | G02B 6/3885 |
| | | | | 385/76 |

FOREIGN PATENT DOCUMENTS

| JP | H0926527 A | 1/1997 |
| JP | H11242131 A | 9/1999 |

(Continued)

OTHER PUBLICATIONS

IEC 61753-1:2018+AMD1:2020 CSV Consolidated version, Amendment 1—Fibre optic interconnecting devices and passive components—Performance standard—Part 1: General and guidance, Webstore IEC, Jun. 24, 2020.

(Continued)

*Primary Examiner* — Jennifer Doan
(74) *Attorney, Agent, or Firm* — Harness, Dickey & Pierce, P.L.C.

(57) ABSTRACT

The present disclosure has an object to provide a multicore optical connector that can achieve size reduction and pitch reduction without performing highly accurate machining of V-grooves or the like. The present disclosure is a multicore optical connector including a holding member 11 having a flat bottom surface 14B, and provided with a groove that enables a plurality of optical fibers 91 to be arranged along the bottom surface 14B, the plurality of optical fibers 91 stored in a row on the bottom surface of the groove, and a lid 15 that is in contact with all the plurality of optical fibers (Continued)

91 and is fixed to the plurality of optical fibers 91 and the holding member 11 in a state in which the plurality of optical fibers 91 are pressed against the bottom surface 14B of the groove to form a long hole 12 at the groove 14.

14 Claims, 17 Drawing Sheets

(56) References Cited

FOREIGN PATENT DOCUMENTS

| JP | 2000111759 A | 4/2000 |
| JP | 2006163210 A | 6/2006 |
| JP | 200741044 A  | 2/2007 |
| JP | 201410403 A  | 1/2014 |

OTHER PUBLICATIONS

D. Marcuse, Loss Analysis of Single-Mode Fiber Splices, The Bell System Technical Journal, vol. 56, No. 5, 1977, pp. 703-718.
Kazuhiko Kurata et al., Prospect of chip scale silicon photonics transceiver for high density multi-mode wiring system, Optics Communications, vol. 362, 2016, pp. 36-42.
International Electrotechnical Commission, Optical circuit boards—Part 4-214: Interface standards—Terminated waveguide OCB assembly using a single-row thirty-two-channel symmetric PMT connector, IEC 62496-4-214 Edition 1.0, May 2020.

* cited by examiner

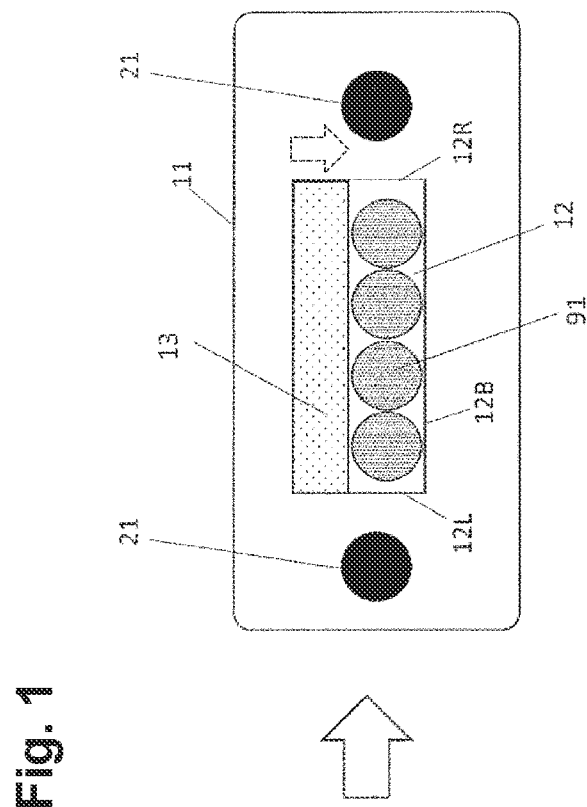
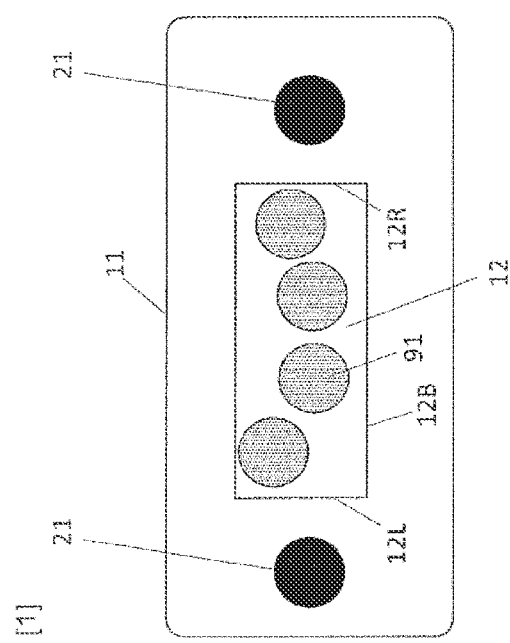
Fig. 1

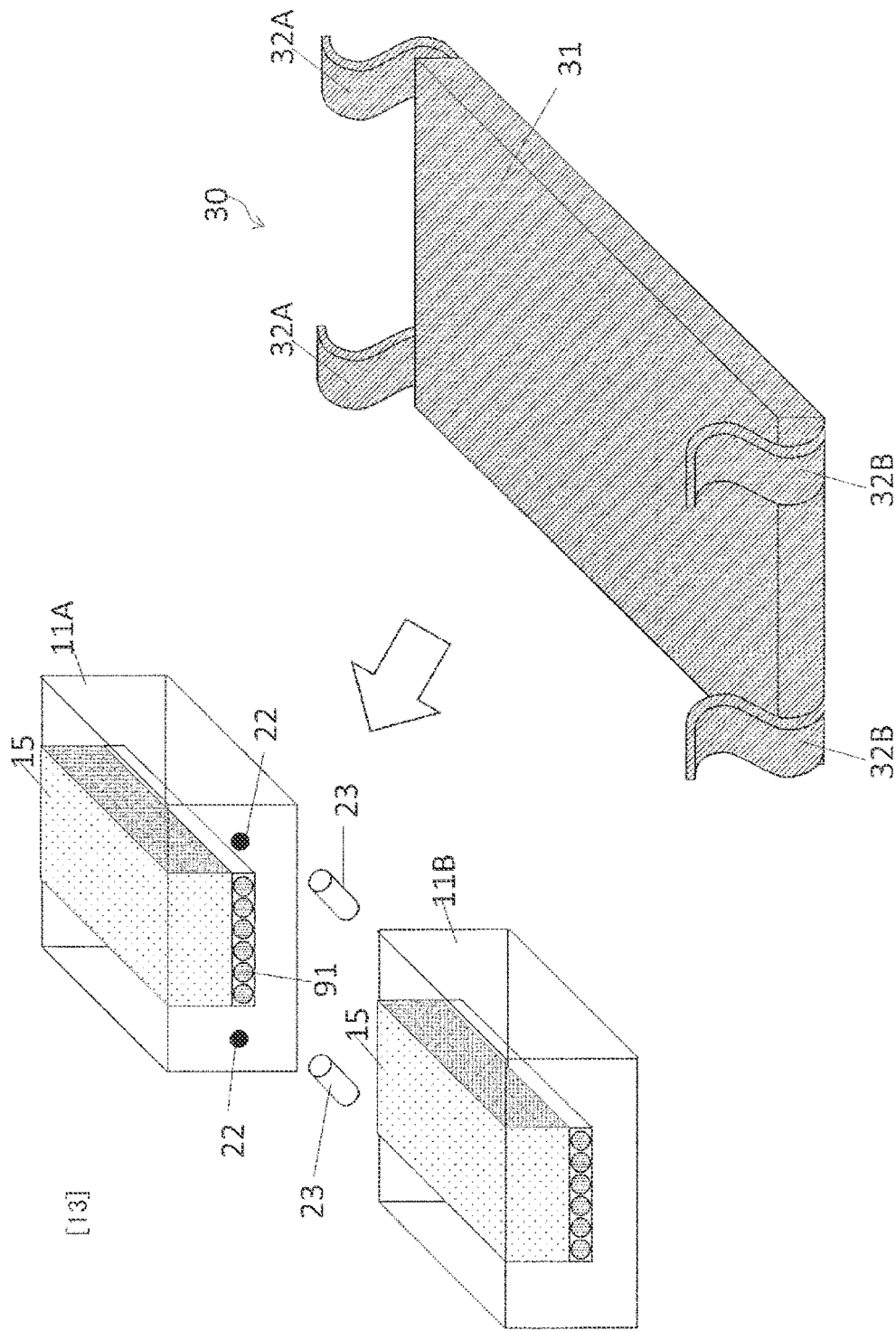

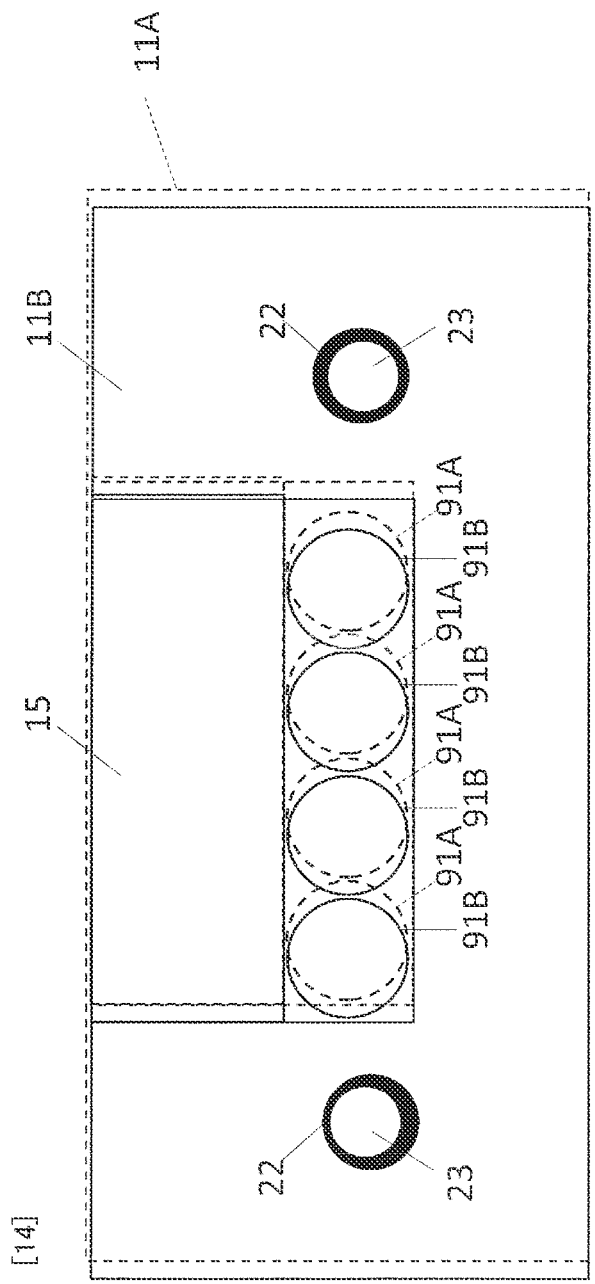

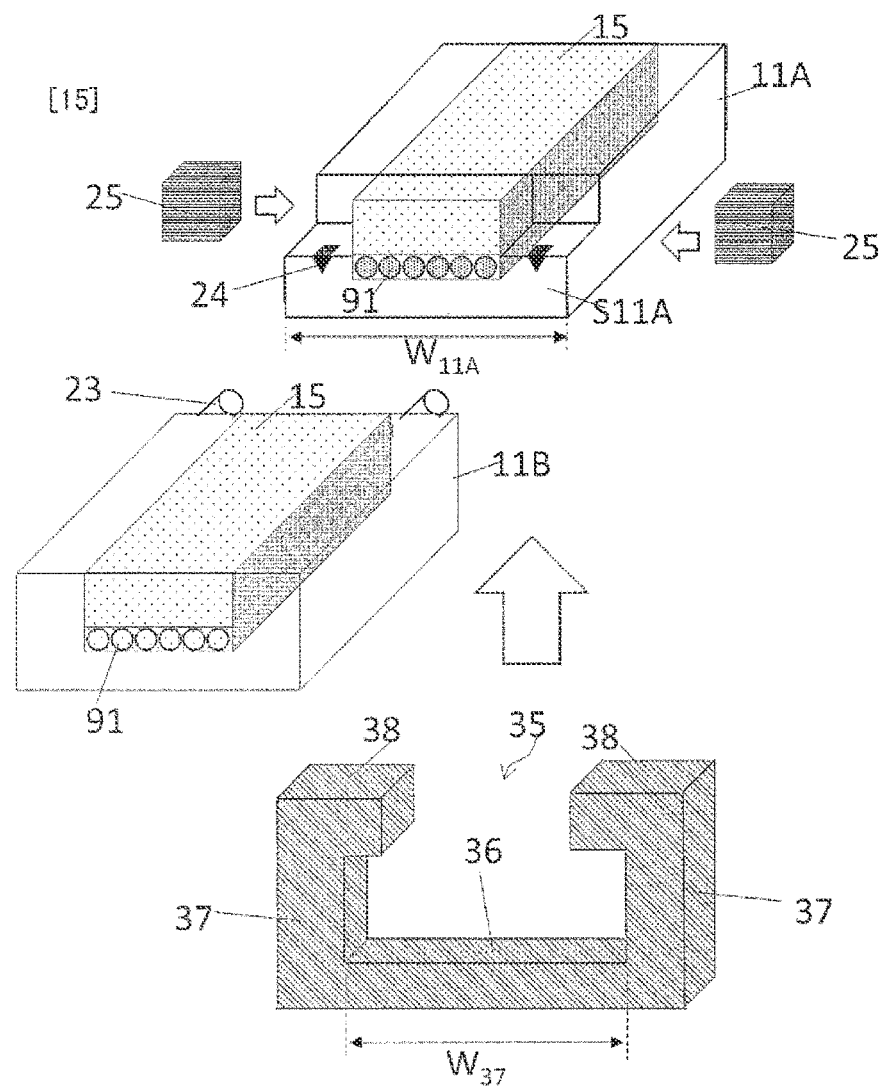

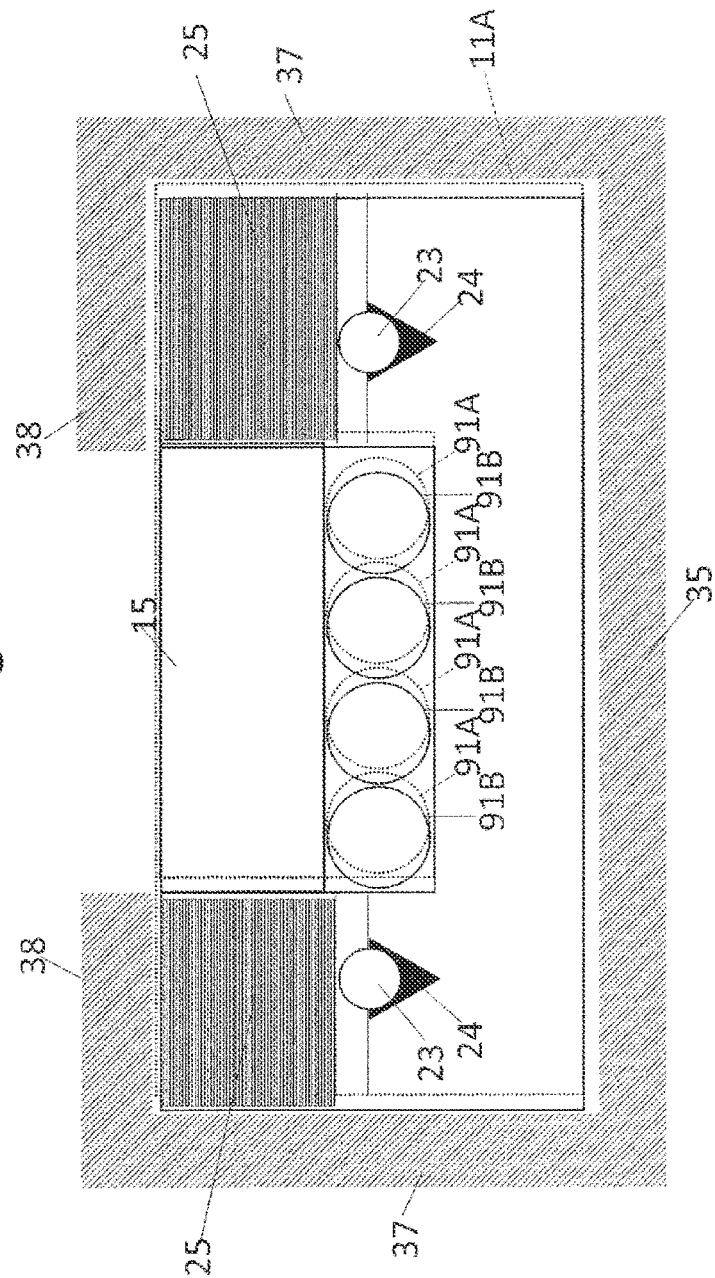

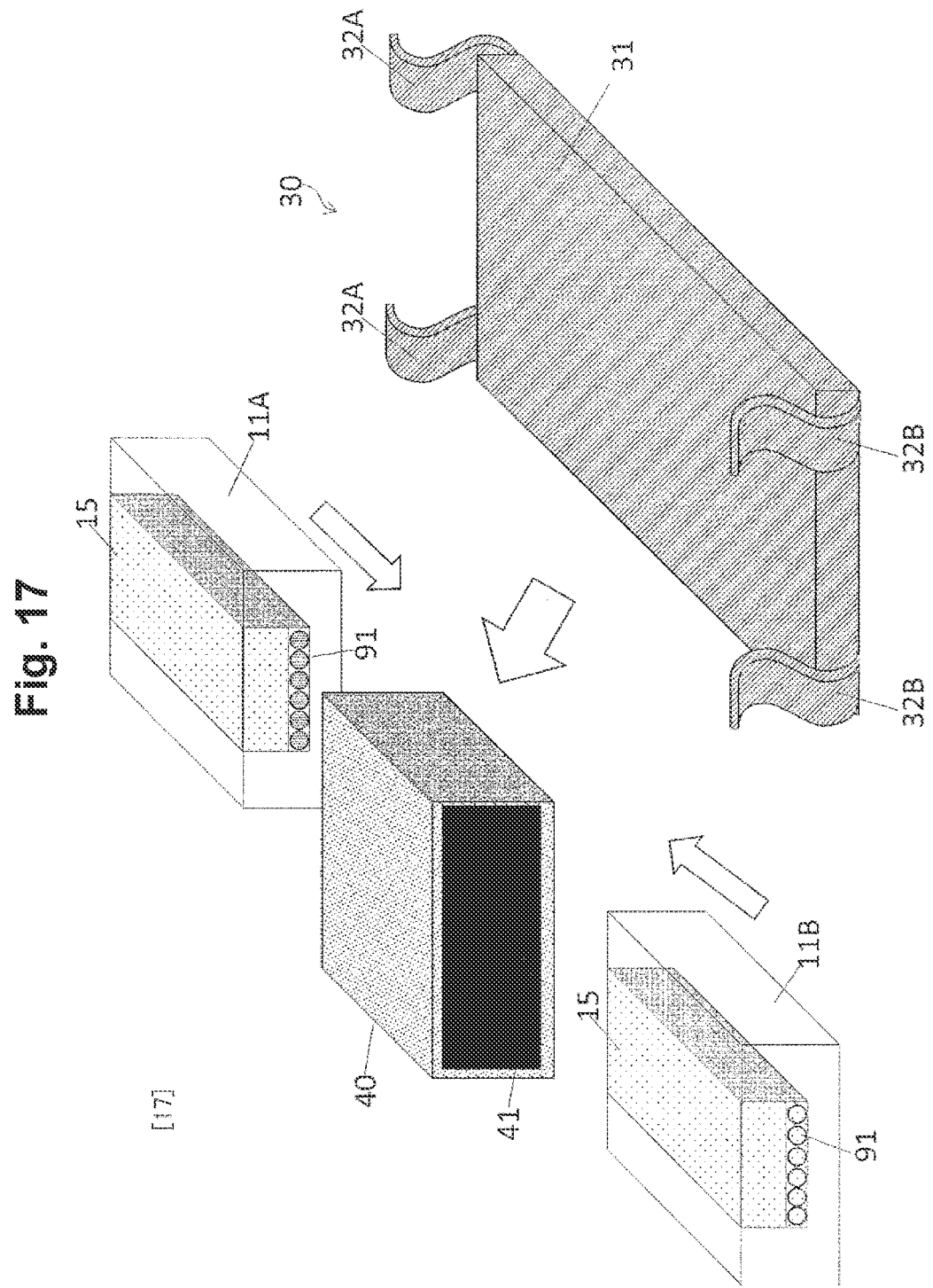

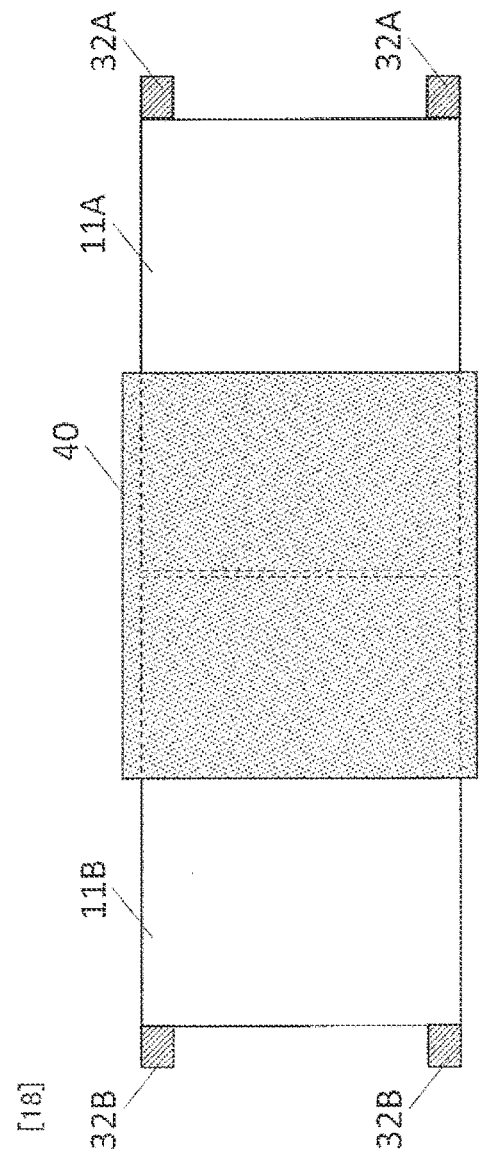

MULTI-FIBER OPTICAL CONNECTOR AND OPTICAL FIBER CONNECTION METHOD

CROSS-REFERENCE TO RELATED APPLICATIONS

This application is a 371 U.S. National Phase of International Application No. PCT/JP2020/034239, filed on Sep. 10, 2020, which claims priority to Japanese Application No. PCT/JP2019/035538 filed on Sep. 10, 2019. The entire disclosures of the above applications are incorporated herein by reference.

TECHNICAL FIELD

The present disclosure particularly relates to, in a multi-core optical connector technology for connecting a plurality of optical fibers collectively, a technology for arranging a plurality of fibers in a lateral row in a single long hole.

BACKGROUND ART

A multicore optical connector in which multicore optical fibers are collectively connected conventionally achieves connection using a member called ferrule. The ferrule is provided with a plurality of round holes, each for a single optical fiber, in one or two rows. A user stores optical fibers in the holes, and inserts guide pins into guide pin holes provided at both ends of the row(s) of holes. Connectors can thus be fitted together to connect the optical fibers. Herein, the position and size of the holes for optical fibers are produced with high accuracy, and the clearance between the holes are provided at an equal interval. Examples of this structure include Patent Literature 1.

On the other hand, as to optical fibers connected to a transmission apparatus, the optical fibers need to be arranged at a pitch reduced in accordance with size reduction and space saving of a device as in Non-Patent Literature 3. Examples of a connector with reduced pitch include a connector in which the pitch of round holes is reduced, and a connector molded with fibers lined up on V-grooves as in Patent Literature 2.

In a multicore optical connector provided with round holes as those of Patent Literature 1, ferrule material present between the holes becomes thinner if the pitch of the holes is reduced, and the strength of the ferrule material is thus degraded, so that a damage such as a crack may occur in the ferrule. Therefore, the multicore optical connector provided with round holes is disadvantageous in that the pitch cannot be reduced.

In addition, in Patent Literature 2, the position of fibers is changed depending on the shape of the V-grooves, so that coupling loss may be adversely affected by the accuracy of the V-grooves. Therefore, the connector molded with fibers lined up on the V-grooves is disadvantageous in that highly accurate machining is required in order to maintain appropriate coupling loss, which increases the cost of components.

CITATION LIST

Patent Literature

Patent Literature 1: Japanese Patent Laid-Open No. 2000-111759

Patent Literature 2: Japanese Patent Laid-Open No. 2007-41044

Non-Patent Literature

Non-Patent Literature 1: IEC 61753-1
Non-Patent Literature 2: D. Marcuse, "Loss Analysis of Single-Mode Fiber Splices", The Bell System Technical Journal, Vol. 56, No. 5, pp. 703-718, 1977.
Non-Patent Literature 3: K. Kurata et al., "Prospect of chip scale silicon photonics transceiver for high density multi-mode wiring system", Optics Communications, Vol. 362, pp. 36-42, 2016.
Non-Patent Literature 4: IEC 62496-4-214

SUMMARY OF THE INVENTION

Technical Problem

The present disclosure has an object to provide a multi-core optical connector that can achieve size reduction and pitch reduction without performing highly accurate machining of V-grooves or the like.

Means for Solving the Problem

In order to achieve the above object, the present disclosure lays down a plurality of optical fibers in a row in a long hole so as to be in contact with an inner bottom surface of the long hole, and shifts and fixes the plurality of optical fibers to one of inner side surfaces of the long hole.

The multicore optical connector according to the present disclosure includes: a holding member provided with a long hole having a flat bottom surface that enables a plurality of optical fibers to be arranged in parallel; the plurality of optical fibers stored on the bottom surface in parallel and in a row; a plate-like body having one surface in contact with the plurality of optical fibers and the other surface contact with a top surface of the long hole, the plate-like body being fixed to the plurality of optical fibers and the holding member in a state in which the plurality of optical fibers are pressed against the bottom surface; and an alignment structure that aligns the plurality of optical fibers.

The multicore optical connector according to the present disclosure includes: a holding member provided with a groove having a flat bottom surface that enables a plurality of optical fibers to be arranged in parallel; the plurality of optical fibers stored on the bottom surface in parallel and in a row; a lid that is in contact with the plurality of optical fibers and is fixed to the plurality of optical fibers and the holding member in a state in which the plurality of optical fibers are pressed against the bottom surface to form a long hole at the groove; and an alignment structure that aligns the plurality of optical fibers.

An optical fiber connection method according to the present disclosure collectively connects a plurality of optical fibers included in two multicore optical connectors using the multicore optical connector according to the present disclosure.

Effects of the Invention

According to the present disclosure, a multicore optical connector that can achieve size reduction and pitch reduction without performing highly accurate machining of V-grooves or the like can be provided.

BRIEF DESCRIPTION OF DRAWINGS

FIG. 1 is a drawing illustrating an example of a connection end surface of a multicore optical connector of a first embodiment.

FIG. 13 illustrates an alignment method through use of guide pins and guide pin holes.

FIG. 14 illustrates an example of a structure of a connection surface of a ferrule in a sixth embodiment.

FIG. 15 illustrates an alignment method through use of guide pins and V-grooves.

FIG. 16 illustrates an example of a structure of a connection surface of a ferrule in a seventh embodiment.

FIG. 17 illustrates an alignment method through use of a sleeve provided with a hole having an inner shape substantially identical to the outer shape of connectors.

FIG. 18 illustrates a top view of the connectors after optical fibers 91 are connected.

DESCRIPTION OF EMBODIMENTS

Figure 2:
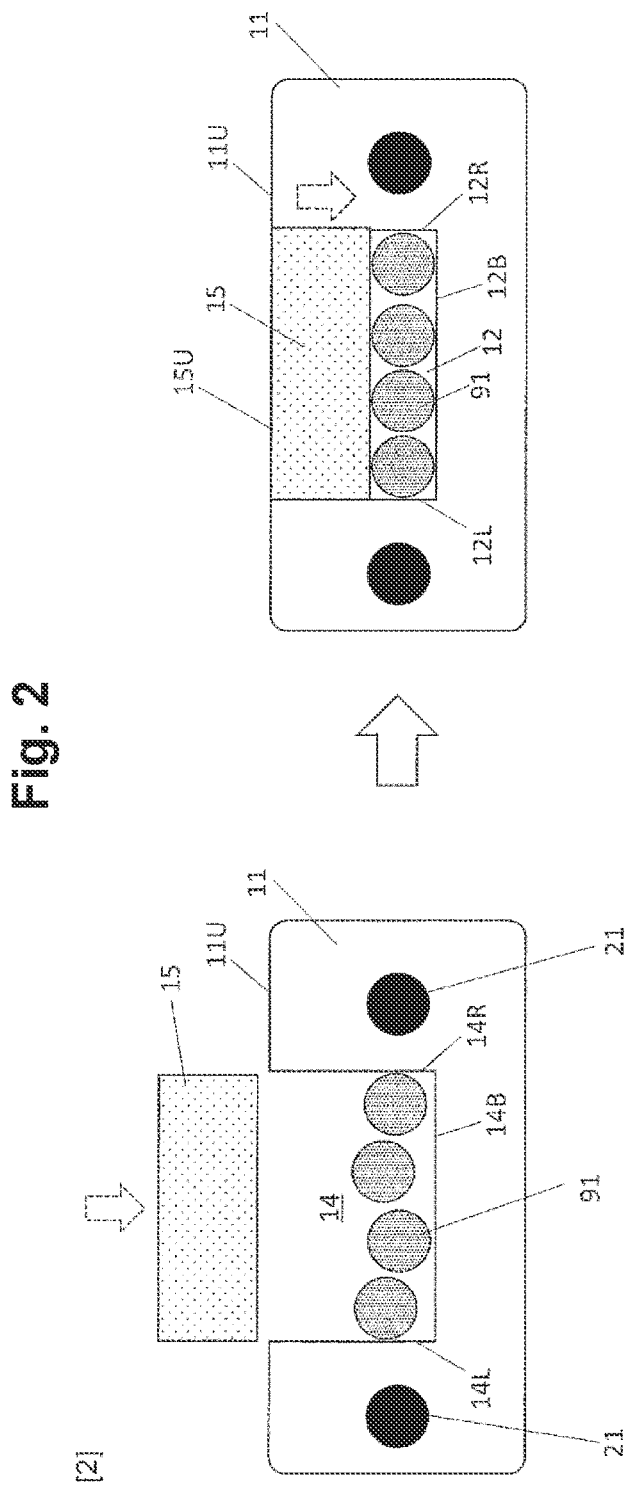
FIG. 2 is a drawing illustrating an example or a connection end surface of a multicore optical connector of a second embodiment.

Hereinafter, embodiments of the present disclosure will be described in detail with reference to the drawings. Note that the present disclosure is not limited to the embodiments presented below. These embodiments are merely for illustration purposes, and the present disclosure can be embodied in forms subjected to various variations and modifications based on the knowledge of one of ordinary skill in the art. Note that components having the same reference numeral in the present specification and drawings shall indicate a component identical to each other.

First Embodiment

FIG. 1 is a drawing illustrating an example of a connection end surface of a multicore optical connector of the present embodiment. The multicore optical connector of the present embodiment includes a ferrule 11 that functions as a holding member in which a rectangular long hole 12 is formed.

The long hole 12 is a through-hole extending through in an extending direction of optical fibers 91. The long hole 12 has a flat bottom surface, and a plurality of (four in the drawing) optical fibers 91 are arranged in parallel in a lateral row on an inner bottom surface 12B of the long hole 12. Since a plate 13 is further located at the upper part of the long hole 12, the position of the optical fibers 91 in the long hole 12 is restricted in the vertical direction.

Herein, the long hole 12 in the ferrule 11 does not need to be rectangle as long as it has a shape in which a desired number of optical fibers 91 can be arranged. For example, FIG. 1 illustrates an example in which an inner wall surface 12L and an inner wall surface 12R are flat surfaces orthogonal to the bottom surface 12B. However, the angle between the bottom surface 12B and the inner wall surface 12L and the angle between the bottom surface 12B and the inner wall surface 12R may be identical or different, or either may be less than 90° or more than 90°. Herein, the inner wall surface 12L and the inner wall surface 12R are side surfaces adjacent to the bottom surface 12B in the long hole, and are surfaces arranged at positions opposite to each other. In addition, the inner wall surface 12L and the inner wall surface 12R may be curved surfaces, rather than flat surfaces.

Although the ferrule 11 is manufactured by any method, extrusion molding or injection molding can be used, for example. In cases in which these manufacturing methods are used, material such as resin constituting the ferrule 11 may contract or distort, so that the inner wall surfaces of the long hole 12 may be curved or become uneven. The inner wall surfaces of the long hole 12 including the bottom surface 12B may have this curve or unevenness occurred during manufacture.

in addition, at the end surface of the ferrule 11, alignment structures 21 may be provided in proximity to both ends which are left and right outer sides of the long hole 12. The alignment structures 21 are guide pin holes, V-grooves, or guide pins, for example.

A plurality of (four in the drawing) optical fibers 91 are placed in the long hole 12, and the plate 13 is inserted onto the optical fibers 91, that is, into a clearance between the upper part of the long hole 12 and the optical fibers 91 while applying an adhesive or the like, for example, and the optical fibers 91 are secured to the ferrule 11 with the long hole 12 in a state in which the optical fibers 91 and the plate 13 are pressed against the bottom surface 12B of the long hole 12. Accordingly, the multicore optical connector of the present embodiment can reduce the vertical clearance in the long hole 12, and can fix the plurality of optical fibers 91 in a state in which the plurality or optical fibers 91 are restricted in the vertical direction.

The present embodiment can fix the optical fibers 91 in the state in which the plurality of optical fibers 91 are restricted in the vertical direction without performing highly accurate machining of the V-grooves or the like. Thus, the present embodiment can provide a multicore optical connector that can achieve size reduction and pitch reduction without performing highly accurate machining of the V-grooves or the like.

Note that the present embodiment describes an example in which the plate 13 is a single member, but the plate 13 may be composed of a plurality of members. For example, the plate 13 may be composed of a plurality of members in the longitudinal direction of the long hole 12, or may be composed of a plurality of members in the short-side direction of the long hole 12. Alternatively, the plate 13 may be arranged partially in the extending direction of the plurality of optical fibers 91 as long as the plurality of optical fibers 91 can be lined up in the vertical direction at the end surface to be connected to another multicore optical connector.

Second Embodiment

FIG. 2 is a drawing illustrating an example of a connection end surface of a multicore optical connector of the present embodiment. In the multicore optical connector of the present embodiment, a groove 14 is formed in the ferrule 11 that functions as a holding member, instead of the long hole 12. A bottom surface 14B of the groove 14 is flat. The groove 14 and a lid 15 are used to constitute the long hole 12. After forming the long hole 12, the bottom surface 14B functions as the bottom surface 12B of the long hole 12, a side surface 14L of the groove 14 functions as the inner wall surface 12L, and a side surface 14R of the groove 14 functions as the inner wall surface 12R.

A plurality of (four in the drawing) optical fibers 91 are placed in the groove 14, and the lid 15 is inserted into the groove 14 while applying an adhesive or the like, for example, from above, and the optical fibers 91 are secured to the bottom surface 14B of the groove 14 using the adhesive in a state in which the lid 15 is pressed against the optical fibers 91 from above. Accordingly, the present embodiment can reduce the vertical clearance in the long hole 12, and can fix the lid 15 and the plurality of optical fibers 91 in a state in which the plurality of optical fibers 91 are restricted in the vertical direction.

An upper surface 15U of the lid 15 may be arranged to be flush with an upper surface 11U of the ferrule 11, or may be arranged differently. For example, the upper surface 15U of the lid 15 may be located below the upper surface 11U of the ferrule 11. A space thereby created can be used as an adhesive pool for a portion of the adhesive not having been used in the long hole 12.

The present embodiment can fix the optical fibers 91 in a state in which the plurality of optical fibers 91 are restricted in the vertical direction without performing highly accurate machining of the V-grooves or the like. Therefore, the present embodiment can provide a multicore optical connector that can achieve size reduction and pitch reduction without performing highly accurate machining of the V-grooves or the like.

Third Embodiment

Figure 3:
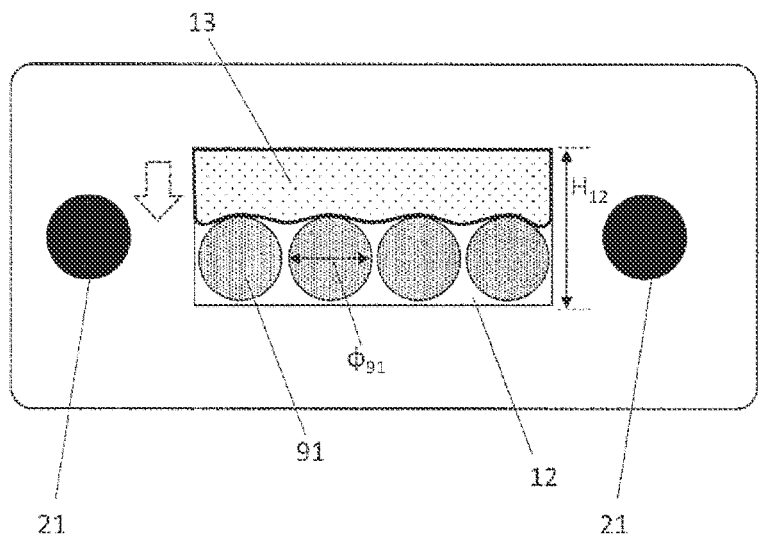
FIG. 3 illustrates an example of a method of axially aligning optical fibers in the vertical direction through use of an elastic plate.

A multicore optical connector of the present embodiment uses an elastic body for the plate 13 of the first embodiment. FIG. 3 illustrates an example of a method of axially aligning the optical fibers 91 in the vertical direction through use of the elastic plate 13. The elastic plate 13 having a vertical width larger than a difference between a vertical width $H_{12}$ of the long hole 12 and an outer diameter $\phi_{91}$ of the optical fibers 91 is inserted into the long hole 12, and the optical fibers 91 are secured to the bottom surface 12B of the long hole 12 using an adhesive in a state in which the plate 13 is in contact with all the optical fibers 91. Accordingly, the optical fibers 91 are pressed against the bottom surface 12B of the long hole 12, so that the optical fibers 91 can be axially aligned in the vertical direction.

Note that the present embodiment describes an example in which the plate 13 is entirely composed of an elastic body, but the present disclosure is not limited to this. For example, a surface of the plate 13 that is to be brought into contact with the plurality of optical fibers 91 may be composed of an elastic material. In this case, by adopting a material having rigidity for the upper surface of the plate 13, the strength of the plate 13 can be maintained, and the plate 13 can be easily inserted into/removed from the long hole 12, which facilitates manufacture.

Fourth Embodiment

Figure 4:
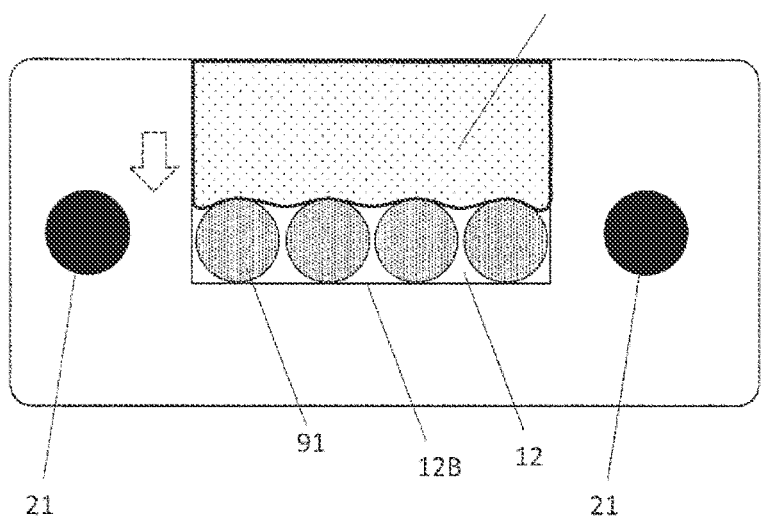
FIG. 4 illustrates a method of axially aligning optical fibers in the vertical direction through use of an elastic lid.

A multicore optical connector of the present embodiment uses an elastic body for the lid 15 of the second embodiment. FIG. 4 illustrates a method of axially aligning the optical fibers 91 in the vertical direction through use of the elastic lid 15. The optical fibers 91 are secured with an adhesive in a state in which the optical fibers 91 are all pressed down using the lid 15 of an elastic material that deforms into a shape in contact with the optical fibers 91. Accordingly, the optical fibers 91 are pressed against the bottom surface 12B of the long hole 12, so that the optical fibers 91 can be axially aligned in the vertical direction.

Note that the present embodiment describes an example in which the lid 15 is entirely composed of an elastic body, but the present disclosure is not limited to this. For example, a surface of the lid 15 that is to be brought into contact with the plurality of optical fibers 91 may be composed of an elastic material. In this case, by adopting a material having rigidity for the upper surface of the lid 15, the strength of the ferrule 11 can be maintained, and the lid 15 can be easily inserted into/removed from the groove 14, which facilitates manufacture.

Fifth Embodiment

Figure 5:
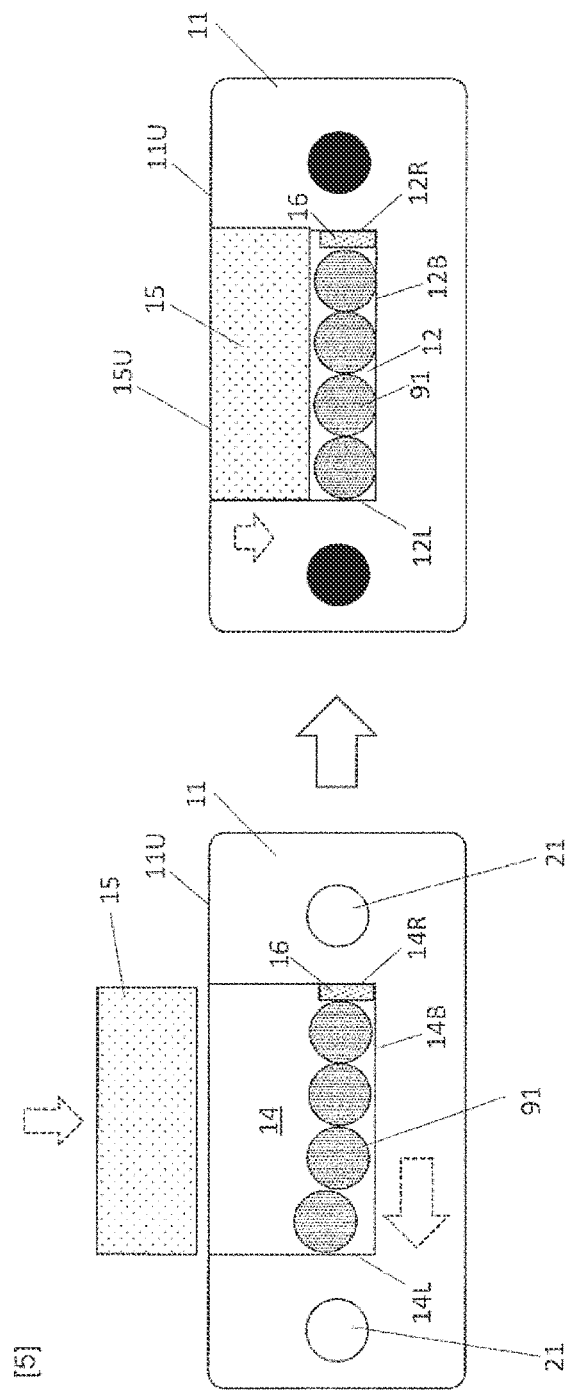
FIG. 5 illustrates a method of axially aligning optical fibers in the lateral direction by means of end alignment.

A multicore optical connector of the present embodiment includes an elastic body at an end of the long hole of the second embodiment. FIG. 5 illustrates a method of axially aligning the optical fibers 91 in the lateral direction by means of end alignment. By placing an elastic body 16 at an end 12R of the long hole 12, the optical fibers 91 stored in the long hole 12 are brought into a state in which the optical fibers 91 are all in contact with each other, and the optical fiber 91 at the other end of the long hole 12 is in contact with the inner wall 12L of the long hole, and an adhesive is applied, and the optical fibers 91 are pressed down with the lid 15 from above for fixing.

The same applies to an opposite ferrule. A state is brought about in which the optical fibers 91 are all in contact with each other, and are shifted to an inner wall in a direction in which the optical fibers 91 are axially aligned when opposed, and an adhesive is applied, and the optical fibers 91 are pressed down with the lid for fixing. Accordingly, the optical fibers 91 can be axially aligned in the lateral direction.

Figure 6:
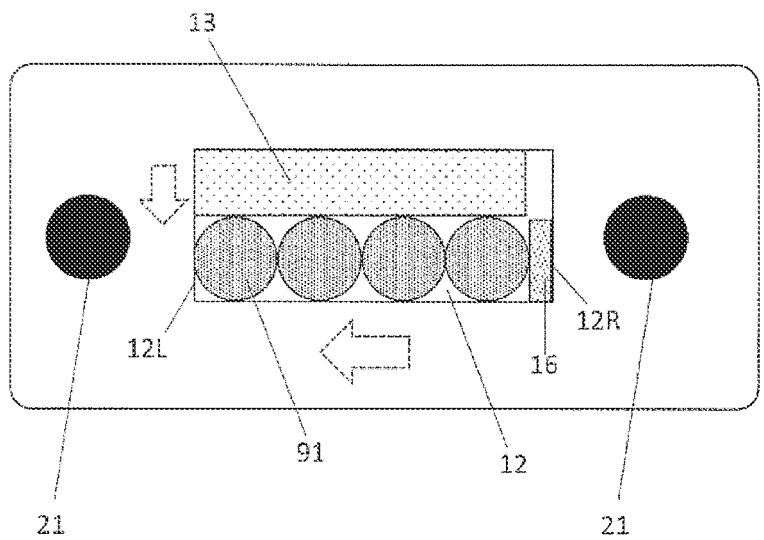
FIG. 6 illustrates a second example of the method of axially aligning optical fibers in the lateral direction by means of end alignment.

Note that also the present embodiment, the lid 15 may be an elastic body. Alternatively, as illustrated in FIG. 6, the long hole 12 and the plate 13 of the first embodiment may be used instead of the groove 14 and the lid 15. Also in this case, the plate 13 may be an elastic body.

Sixth Embodiment

Figure 7:
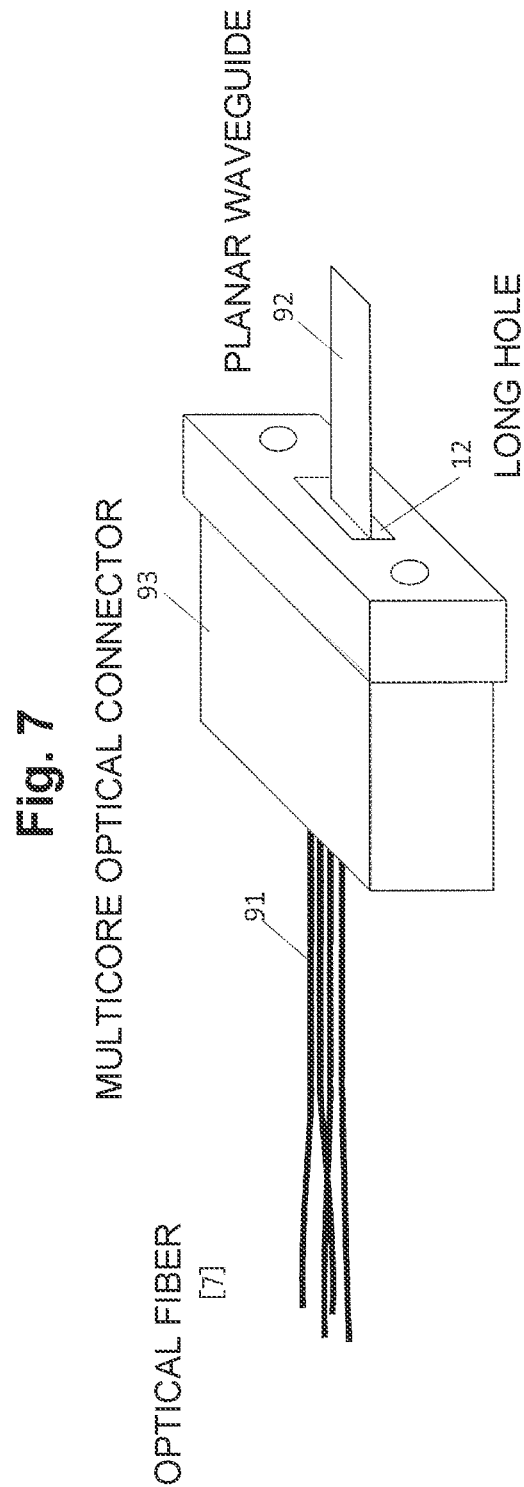
FIG. 7 illustrates a schematic configuration of a multicore optical connector of an embodiment of the present disclosure.

FIG. 7 illustrates a schematic configuration of a multicore optical connector of the present embodiment. In order to connect a planar waveguide 92 in which multi-channel cores are arranged and the plurality of optical fibers 91, the present embodiment provides a multicore optical connector 93 in which the optical fibers 91 are arranged at a fiber pitch reduced by an appropriate strength and appropriate coupling loss of the connector.

For the multicore optical connector 93 that has a higher density and an axial alignment mechanism together, the single long hole 12 having a flat bottom surface is adopted to reduce the pitch of the optical fibers 91 to the pitch of the planar waveguide 92, and the position of the optical fibers 91 is limited to a predetermined range to achieve the waveguide of the planar waveguide 92 and appropriate coupling loss.

Figure 8:
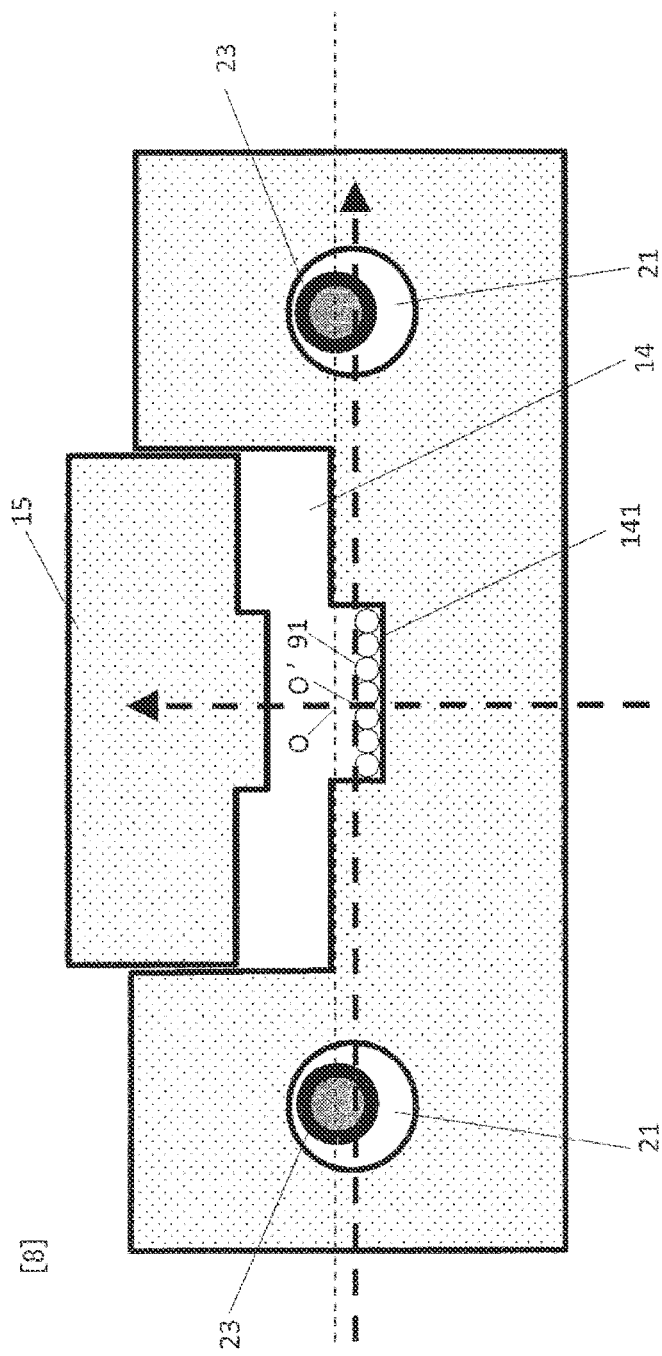
FIG. 8 is a drawing illustrating an example of a connection end surface of the multicore optical connector.

FIG. 8 is a drawing illustrating an example of a connection end surface of a multicore optical connector of the present embodiment. In the multicore optical connector of the present embodiment, the groove 14 has a multi-step configuration, and the optical fibers 91 are arranged at the lowest part of the groove 14. The lid 15 has a multi-step configuration that conforms to the multi-step configuration of the groove 14. The long hole 12 is formed using the groove 14 and the lid 15. The drawing illustrates a connection origin O which is the midpoint of a line connecting the centers of guide pins 23, and a connector origin O' which is the midpoint of a line connecting the centers of two guide pin holes which are the alignment structures 21.

Figure 9:
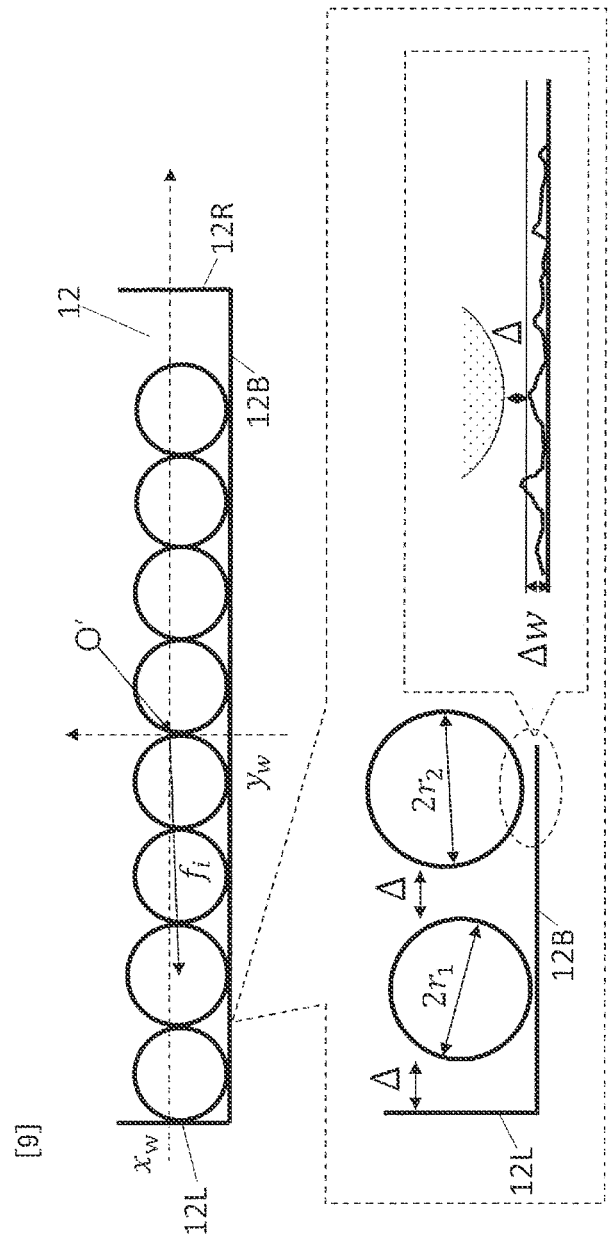
FIG. 9 illustrates an enlarged view of the bottom of a long hole 12.

FIG. 9 illustrates an enlarged view of the bottom of the long hole 12. The present embodiment describes a preferable condition for a clearance Δ between the respective optical fibers 91 to be connected to the planar waveguide 92, a clearance Δ between the optical fibers 91 and the bottom surface 12B of the long hole 12, and a clearance Δ between the optical fiber 91 and the left inner wall surface 12L. A position vector $d_{A,i}$ of the core of an i-th optical fiber 91 of a connector A as seen from the connection origin O is expressed as follows.

[Math. 1]

$$d_{A,i} = p_A + f_{A,i} \quad (1)$$

Herein, $p_A$ denotes the position vector of the connector origin O' as seen from the connection origin O, and $f_{A,i}$ denotes the position vector of the core of the i-th optical fiber 91 as seen from the connector origin O', which are expressed as follows.

[Math. 2]

$$p_A = \left( \frac{x_{h_l} + x_{h_r}}{2}, \frac{y_{h_l} + y_{h_r}}{2} \right) \quad (2)$$

[Math. 3]

$$f_{A,i} = (x_i, y_i)$$
$$= \left( \sum_{j=1}^{i} \sqrt{(r_l + \Delta x_i + r_{j-1})^2 - (y_j - y_{j-1})^2} + \Delta w, y_w + \Delta w_i + \Delta y_i + r_i \right) \quad (3)$$

Note that $x_{hl}, y_{hl}$ denote the x-coordinate and y-coordinate of the center of the left guide pin hole in a connection coordinate system, and $x_{hr}, y_{hr}$ denote the x-coordinate and y-coordinate of the center of the right guide pia hole in the connection coordinate system. The relations $r_0 = x_w$ and $y_0 = y_1$ hold. Herein, $x_w$ denotes the position of the inner wall surface 12L, $y_w$ denotes the position of the bottom surface 12B, Δw denotes an uneven width of the inner wall surface 12L, $r_i$ denotes the radius of the optical fibers 91, $\Delta x_i$ denotes a clearance in the X direction between the optical fibers 91 or between the optical fiber 91 and the inner wall surface 12L/12R, and $\Delta y_i$ denotes a clearance in the Y direction between the optical fiber 91 and the bottom surface 12B. In FIG. 9, $\Delta x_i$ and $\Delta y_i$ are denoted by Δ.

On the other hand, Non-Patent Literature 4, for example, defines that the positions of cores of a planar waveguide to be connected to a multicore optical connector are arranged such that the positions in the x-axis direction of the cores of the planar waveguide 92 with respect to the connector origin O' are −0.4375, −0.3125, −0.1875, −0.0625, 0.0625, 0.1875, 0.3125, and 0.4375, and the positions in the y-axis direction of the cores of the planar waveguide 92 with respect to the connector origin O are all zero. In this case, a position vector $f_{B,i}$ of an i-th core of the planar waveguide 92 is expressed as follows.

[Math. 4]

$$f_{B,i} = (125(4|i)62.5 + \sigma_x, \sigma_y) \quad (4)$$

Herein, $\sigma_x$ and $\sigma_y$ denote manufacturing errors of the planar waveguide 92.

A relative displacement $d_i$ between the cores when the optical fibers 91 and the planar waveguide 92 are connected is expressed as follows.

[Math. 5]

$$d_i = d_{A,i} - d_{B,i} \quad (5)$$

A coupling loss $L_i$ of an optical fiber i is determined by the relative displacement $d_i$ of the fiber cores, and expressed as follows:

[Math. 6]

$$L_i[dB] = 4.34 \left( \frac{|d_i[\mu m]|}{4.3} \right)^2 \quad (6)$$

(see Non-Patent Literature 2, p. 714, Expression (28), for example).

In addition, Non-Patent Literature 1, for example, defines that an optical connector has a coupling loss of less than or equal to 1 dB, and it is desirable that the coupling loss is less than or equal to 1 dB in terms of connection with the planar waveguide. Thus, a result of performing a numerical analysis such as the Monte Carlo method using Expression (6) has revealed that, if each clearance Δ with respect to the number of cores N is less than or equal to g(N) in the next expression, the coupling loss with the planar waveguide 92 is less than or equal to 1 dB.

[Math. 7]

$$g(N)[\mu m] = 1.73 - 0.72\sqrt{N} + 0.095N - 0.00058N^2 \quad (7)$$

Figure 10:
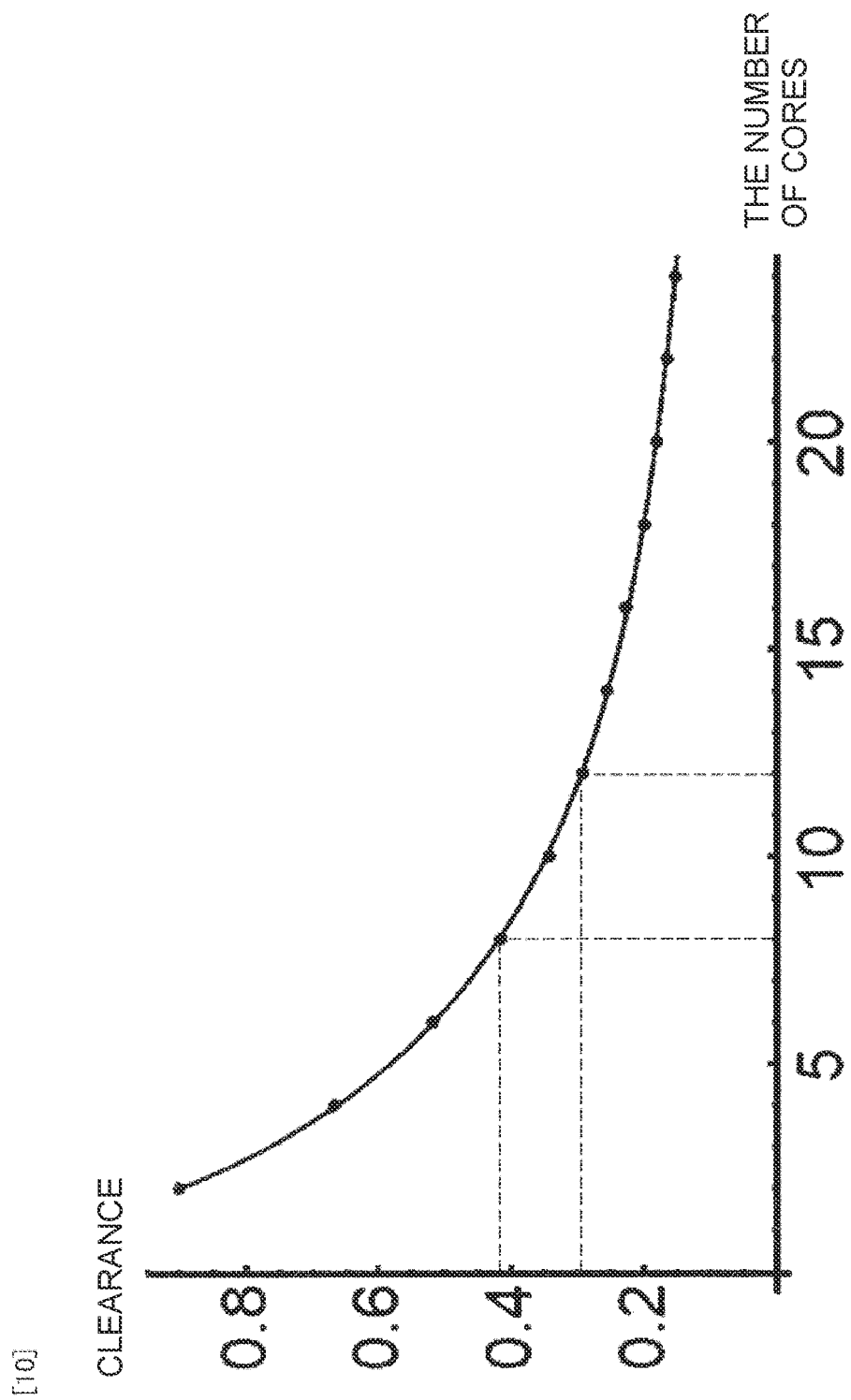
FIG. 10 illustrates an example of a relation between the number of cores and clearance that achieves a coupling loss of less than or equal to 1 dB.

For example, as illustrated in FIG. 10, assume that each clearance Δ including $\Delta x_i$ and $\Delta y_i$ is 0.41 μm for eight cores, and 0.29 μm for twelve cores. By adopting a structure that satisfies this relation, connection with the planar waveguide 92 can be performed at a coupling loss of less than or equal to 1 dB. The relation of Expression (7) is applicable to any number of cores N of more than or equal to two and less than or equal to thirty two.

As described above, the coupling loss between the planar waveguide 92 and the optical fibers 91 can be reduced to within 1 dB by arranging the optical fibers 91 at a predetermined position, and practical use as a multicore optical connector can be achieved.

EXAMPLES

Hereinafter, a multicore optical connector according to the present embodiment will be described with reference to the drawings.

Figure 11:
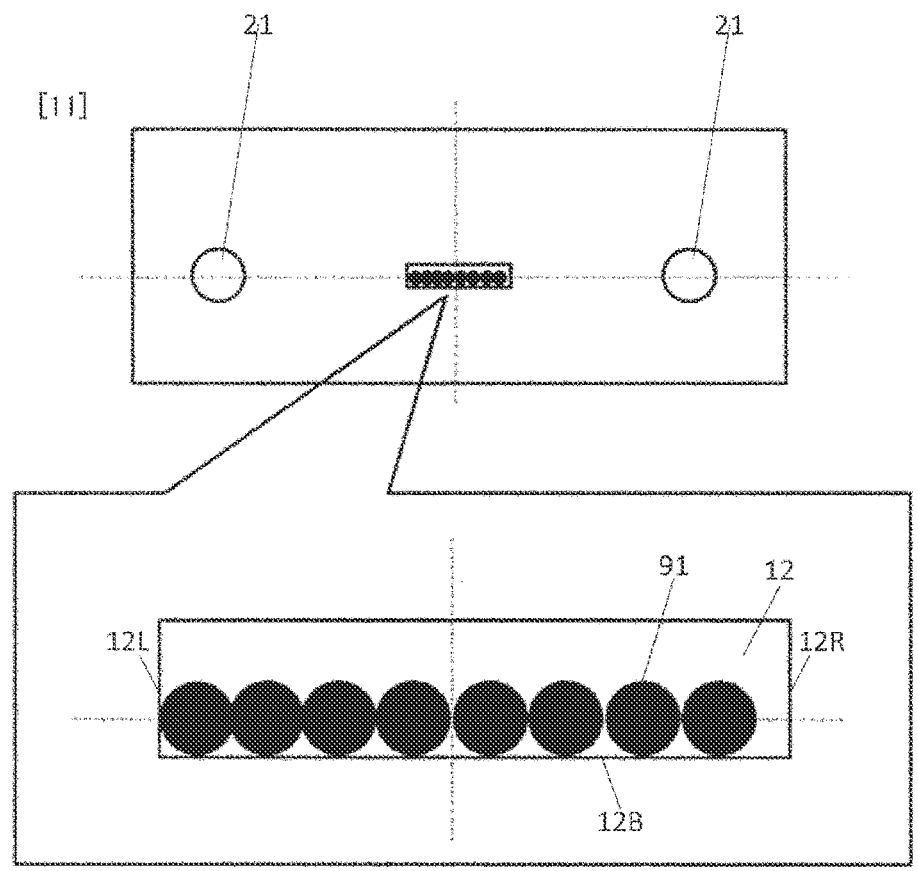
FIG. 11 is a drawing illustrating an example of a connection end surface of a multicore optical connector.

FIG. 11 is a drawing illustrating an example of a connection end surface of the multicore optical connector of the present embodiment. In the ferrule 11 in which the rectangular long hole 12 is formed, the plurality of (eight in the drawing) optical fibers 91 are shifted with reference to either the left or right wall (the left inner wall surface 12L in the drawing) and the bottom surface 12B, and on that occasion, the central positions of the respective optical fibers 91 are arranged uniformly on the left and right at the same height with respect to the central position O' of the connector. Note that the long hole 12 in the ferrule 11 does not need to be rectangular as long as it has a shape that enables the optical fibers 91 to be arranged at a desired position. In addition, at the end surface of the ferrule 11, the alignment structures are provided on the left and right outer sides of the long hole 12. The plurality of (eight in the drawing) optical fibers 91 are placed in the long hole 12, and the optical fibers 91 are brought into a state of being shifted to an inner wall (the left inner wall surface 12L in the drawing) of the long hole 12, and an adhesive is applied to fix the optical fibers 91 at the desired position. Herein, in order to make the clearance less than or equal to a desired value, for the vertical clearance, for example, there are methods such as pressing the optical fibers 91 with the plate 13 to reduce the width of the long hole 12 to a width less than or equal to the fiber diameter and the desired value, or inserting a plate or an elastic body into the long hole 12 to reduce the hole width. In addition, examples of a method for making the lateral clearance less than or equal to a desired value include a method of inserting a plate or an elastic body onto one of the walls in the long hole 12 to shift the optical fibers 91 to the other wall, and a method of having the leading ends of the optical fibers 91 protrude from the long hole 12 and applying a lateral pressure to the leading ends to shift the optical fibers 91, and cutting the optical fibers 91 at the connector end surface after bonding and fixing.

Figure 12:
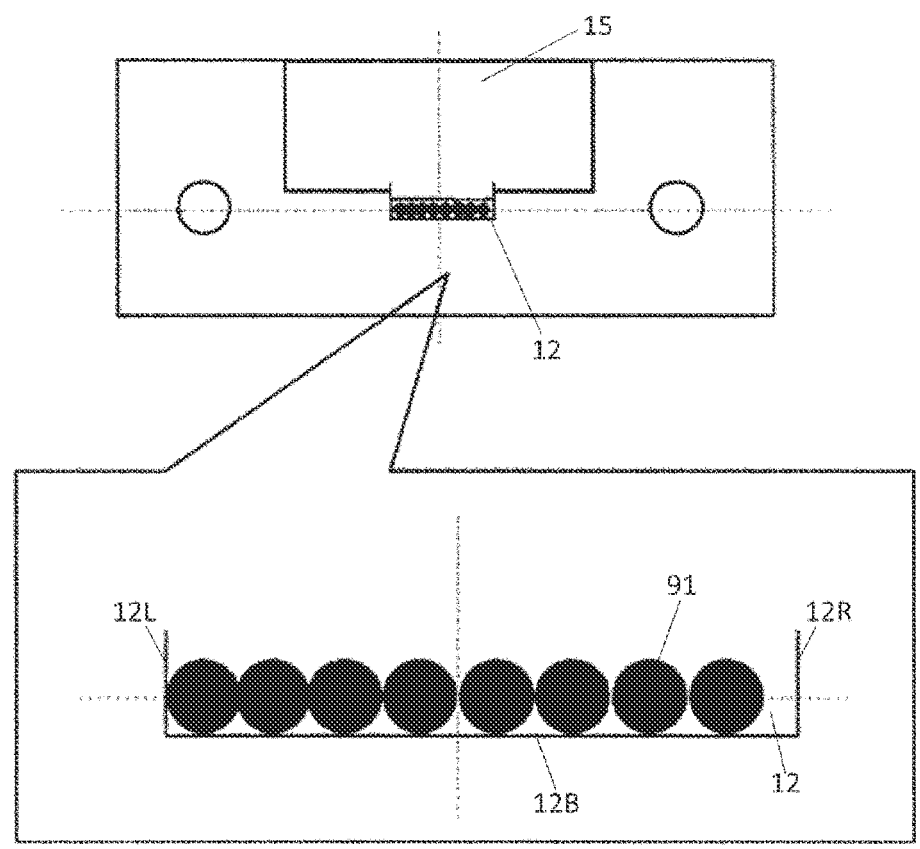
FIG. 12 is a drawing illustrating an example of a structure in which a long hole is provided by using a groove and a lid.

FIG. 12 illustrates a structure in which the long hole 12 is provided using the groove 14 and the lid 15. The plurality of (eight in the drawing) optical fibers 91 are placed in the groove 14, and the lid 15 is placed in the groove 14 while applying an adhesive or the for example, from above, and securing the adhesive in a state in which the lid 15 is pressed down from above to reduce the vertical clearance in the long hole 12, so that the lid 15 and the optical fibers 91 can be fixed in a state in which the optical fibers 91 are restricted in the vertical direction. Herein, in order to make the clearance less than or equal to a desired value, for the vertical clearance, for example, there are methods such as pressing the optical fibers 91 with the lid 15 to reduce the width of the groove 14 or the lid 15 to a width less than or equal to the fiber diameter and the desired value, or attaching a plate or an elastic body to the lid 15 to be brought into contact with the optical fibers 91, so that the optical fibers 91 are pressed against the groove 14. In addition, examples of a method of making the lateral clearance less than or equal to a desired value include a method of inserting a plate or an elastic body onto one of the walls of the long hole 12 to shift the optical fibers 91 to the other wall, and a method of having the leading ends of the optical fibers 91 protrude from the long hole 12 and applying a lateral pressure to the leading ends to shift the optical fibers 91, and cutting the optical fibers at the connector end surface after bonding and fixing.

Seventh Embodiment

FIG. 12 illustrates an alignment method in which the guide pins 23 and guide pin holes 22 are used for the alignment structure 21. Ferrules 11A and 11B each provided with the guide pin holes 22 at both ends of the long hole are opposed. The guide pins 23 are used for alignment of the ferrules 11A and 11B and are inserted into the guide pin holes 22, and the ferrules 11A and 11B are fixed with a connection clip 30. Accordingly, as illustrated in FIG. 13, optical fibers 91A fixed in the long hole of the ferrule 11A and optical fibers 91B fixed in the long hole of the ferrule 11B are connected.

Any structure that can fix the ferrules 11A and 11B can be adopted for the connection clip 30. For example, a substrate 31 provided with springs 32A and 32B that press the ferrules 11A and 11B from their both ends can be used.

Eighth Embodiment

FIG. 14 illustrates an alignment method in which guide pins and V-grooves are used for the alignment structure 21. In the present embodiment, the ferrule 11B provided with the guide pins 23 and the ferrule 11A provided with V-grooves 24 are used. Blocks 25 are placed on the guide pins 23 in a state in which the guide pins 23 are placed on the V-grooves 24, and the blocks 25 are pressed with a presser clip 35 from above.

The blocks 25 have a shape identical to that of cutouts formed in the ferrule 11A for providing the V-grooves 24. The presser clip 35 presses the blocks 25 along the cutouts of the ferrule 11A to fix the guide pins 23 in the V-grooves 24. Accordingly, the present embodiment can connect the optical fibers 91 while aligning the optical fibers 91.

FIG. 15 illustrates an example of a structure of a connection surface of the ferrule. Any structure that can press the guide pins 23 against the V-grooves 24 can be adopted for the presser clip 35. For example, the substrate 31 provided with L-shaped stops 37 that press the blocks 25 from above can be used. An interval W37 between the stops 37 is equal to a lateral width W11A of the ferrule 11A. In addition, leading ends 38 of the stops 37 reach the V-grooves 24, and may have a length enough to cover the blocks 25. Note that the present embodiment may further include the connection clip 30.

Ninth Embodiment

FIG. 16 illustrates an alignment method through use of a sleeve 40 provided with a through-hole 41 having an inner shape substantially identical to the outer shape of the ferrules 11A and 11B. FIG. 17 illustrates a top view of the connectors after the optical fibers 91 are connected. In the present embodiment, the ferrules 11A and 11B are inserted from both ends of the sleeve 40 and fixed by means of the connection clip 30 or the like so as not to be pulled out, thereby achieving alignment in the sleeve 40. Accordingly, the present embodiment can connect the optical fibers 91 while aligning the optical fibers 91.

Note that also in the present embodiment, the ferrules 11A and 11B may include an alignment structure. This can increase the accuracy of aligning the positions of the fibers.

Herein, it has been described that the number of the optical fibers 91 described in the above embodiments is either four or eight, but the number of the optical fibers 91 is not particularly specified. The adhesive that fixes the lid 15 illustrated in FIG. 2 and the subsequent drawings is not particularly specified as long as pressing can be maintained. Alternatively, a method such as maintaining pressing with a pressing clip or the like other than an adhesive can be adopted. The connection clip 30 illustrated in FIG. 12 to FIG. 17 is not particularly specified, and a method such as performing connection by applying a spring force from behind using a housing member, for example, may be adopted.

Effects Produced by the Present Disclosure

Since no ferrule material is present between the optical fibers, the problem of a damage that would be caused by thinning of the material when reducing the pitch of the optical fibers is solved, and the pitch of the optical fibers can be reduced to the fiber diameter.

Size reduction and pitch reduction can be achieved to enable connection with a more compact module.

Alignment is achieved with optical fibers shifted to the bottom surface or either the left or right inner wall of a long hole by virtue of resilience of an elastic body, and the optical fibers can be axially aligned to reduce coupling loss.

A precise shape is not required because of the elastic body, and the cost is lower than when performing highly accurate machining of V-grooves.

INDUSTRIAL APPLICABILITY

The present disclosure is applicable to the information and communication industry.

REFERENCE SIGNS LIST 11 ferrule
12 long hole
13 plate
14, 141 groove
15 lid
16 elastic body
21 alignment structure
22 guide pin hole
23 guide pin
24 V-groove
25 block
30 connection clip
31 substrate
32A, 32B spring
37 stop
35 presses clip
40 sleeve
41 through-hole
91 optical fiber
92 planar waveguide
93 multicore optical connector

The invention claimed is:

1. A multicore optical connector comprising:
a holding member provided with a longitudinal hole, the longitudinal hole extending along a first direction, the longitudinal hole having a flat bottom surface, the longitudinal hole having first and second side surfaces outwardly opposite to each other along a second direction perpendicular to the first direction, the first and second side surfaces extending from opposite ends of the flat bottom surface;
a plurality of optical fibers stored on the flat bottom surface of the longitudinal hole and arranged in parallel and in a row along the second direction, each of the plurality of optical fibers extending along the first direction in the longitudinal hole, first and second optical fibers of the plurality of optical fibers being located at outermost opposite ends thereof along the second direction; and
an alignment structure that aligns the plurality of optical fibers, wherein
the first optical fiber is in contact with the first side surface of the longitudinal hole,
a side of the second optical fiber is in contact with an elastic body, and the elastic body is located in a gap between the side of the second optical fiber and the second side surface of the longitudinal hole, and
every adjacent two optical fibers of the plurality of optical fibers are in contact with each other.

2. The multicore optical connector according to claim 1, wherein
a distance between the first side surface and a central position of the multicore optical connector determined by the alignment structure in a direction horizontal to the flat bottom surface in the longitudinal hole is less than or equal to a predetermined value.

3. The multicore optical connector according to claim 1, wherein
each of a clearance between adjacent two optical fibers of the plurality of optical fibers, a clearance between one of the plurality of optical fibers and the flat bottom surface, and a clearance between the first optical fiber and the first side surface falls within a predetermined range.

4. The multicore optical connector according to claim 3, wherein
the number of cores of the plurality of optical fibers is the number of cores N of more than or equal to two and less than or equal to thirty-two, and
the predetermined range is more than or equal to 0 μm and less than or equal to $(1.73-0.72\sqrt{N}+0.095N-0.00058N^2)$ μm.

5. The multicore optical connector according to claim 1, wherein
the longitudinal hole is configured with:
a groove provided in the holding member; and
a lid fixed to the plurality of optical fibers and the holding member in a state in which the plurality of optical fibers are pressed against the flat bottom surface to form the longitudinal hole at the groove,
a surface of the lid that is in contact with the plurality of optical fibers is composed of an elastic material, and
the elastic material is deformed to a shape in contact with all the plurality of optical fibers stored in the longitudinal hole.

6. The multicore optical connector according to claim 1, wherein
the elastic body is deformed to a shape in contact with the second side surface of the longitudinal hole and the second optical fiber.

7. The multicore optical connector according to claim 1, wherein the alignment structure includes at least any one of
- a guide pin hole provided in proximity to an end of the longitudinal hole in the first direction,
- a V-groove provided in proximity to the end of the longitudinal hole in the first direction, and
- a sleeve provided with a through-hole having an inner shape substantially identical to an outer shape of the holding member that holds the plurality of optical fibers.

8. An optical fiber connection method comprising, using the multicore optical connector according to claim 1:
- collectively connecting a plurality of optical fibers included in two multicore optical connectors; or
- connecting a plurality of optical fibers included in a single multicore optical connector to a plurality of optical cores included in a single planar waveguide.

9. The multicore optical connector according to claim 1, wherein
- a first angle between the flat bottom surface and the first side surface is 90°, and a second angle between the flat bottom surface and the second side surface is 90°.

10. The multicore optical connector according to claim 1, wherein
- a first angle between the flat bottom surface and the first side surface is less than 90° or more than 90°, and a second angle between the flat bottom surface and the second side surface is less than 90° or more than 90°.

11. The multicore optical connector according to claim 1, wherein
- a first angle between the flat bottom surface and one of the first and second side surfaces is 90°, and a second angle between the flat bottom surface and the other of the first and second side surfaces is less than 90° or more than 90°.

12. The multicore optical connector according to claim 1, wherein
- each of the first and second side surfaces is a curved surface.

13. The multicore optical connector according to claim 1, wherein
- each of the first and second side surfaces is a flat surface.

14. The multicore optical connector according to claim 1, wherein
- the plurality of optical fibers are secured with an adhesive in the longitudinal hole.

\* \* \* \* \*